United States Patent
Johnson et al.

(10) Patent No.: US 11,566,513 B2
(45) Date of Patent: Jan. 31, 2023

(54) FORMATION DIP EVALUATION SYSTEM

(71) Applicant: Halliburton Energy Services, Inc., Houston, TX (US)

(72) Inventors: Paul Blair Johnson, Manvel, TX (US); Yang Miao, Cypress, TX (US); Jeremy James Combs, Spring, TX (US); Renata Da Gama Saintive, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 193 days.

(21) Appl. No.: 16/770,884

(22) PCT Filed: Mar. 12, 2018

(86) PCT No.: PCT/US2018/022030
§ 371 (c)(1),
(2) Date: Jun. 8, 2020

(87) PCT Pub. No.: WO2019/177575
PCT Pub. Date: Sep. 19, 2019

(65) Prior Publication Data
US 2021/0164338 A1    Jun. 3, 2021

(51) Int. Cl.
*E21B 47/026* (2006.01)
*G01V 3/18* (2006.01)
(Continued)

(52) U.S. Cl.
CPC .............. *E21B 47/026* (2013.01); *E21B 7/04* (2013.01); *G01V 3/18* (2013.01); *G01V 3/38* (2013.01)

(58) Field of Classification Search
CPC ............ E21B 47/026; G01V 3/18; G01V 3/38
See application file for complete search history.

(56) References Cited

U.S. PATENT DOCUMENTS

2006/0175057 A1    8/2006   Mandal et al.
2012/0191354 A1    7/2012   Caycedo
(Continued)

FOREIGN PATENT DOCUMENTS

WO    2011022012 A1    2/2011

OTHER PUBLICATIONS

Pitcher et al., Advances in Geosteering Technology: From Simple to Complex Solutions, Feb. 2-4, 2010, 2010 IADC/SPE Drilling Conference and Exhibition, New Orleans, Louisiana, 14 pp. (Year: 2010).*

(Continued)

*Primary Examiner* — Toan M Le
(74) *Attorney, Agent, or Firm* — McGuireWoods LLP

(57) ABSTRACT

The disclosed embodiments include systems and methods to evaluate a formation dip of a formation bedding. The system includes memory configured to store a color image indicative of a log of a formation bedding. The system also includes a processor configured to execute instructions to filter colors of the color image to determine one or more cusps of the formation dip, and cross correlate a reference wave with the one or more cusps of the formation dip to match curvatures of the reference wave with the one or more cusps of the formation dip illustrated in the color image, wherein the curvatures of the reference wave are based on one or more parameters of the formation bedding. The processor is further operable to generate a wave that matches the one or more cusps of the formation dip with the reference wave, where the wave is indicative of the formation dip.

18 Claims, 5 Drawing Sheets

(51) Int. Cl.
*G01V 3/38* (2006.01)
*E21B 7/04* (2006.01)

(56) References Cited

U.S. PATENT DOCUMENTS

2015/0377003 A1 12/2015 Benson et al.
2017/0160421 A1 6/2017 Zhang et al.

OTHER PUBLICATIONS

International Search Report and Written Opinion dated Jan. 2, 2019, International PCT Application No. PCT/US2018/022030.

\* cited by examiner

FORMATION DIP EVALUATION SYSTEM

BACKGROUND

The present disclosure relates generally to systems and methods to evaluate a formation dip of a formation proximate a wellbore.

Data indicative of a formation dip of a downhole formation, such as the relative dip of the downhole formation, the true vertical dip of the downhole formation, and the apparent dip of the downhole formation, are often gathered during preparation, drilling, and completion stages of a hydrocarbon well. Data indicative of the formation dip of the formation are sometimes obtained from logs of the formation obtained during logging while drilling (LWD) and measurement while drilling (MWD) operations and are analyzed to determine how to prepare a well path along the downhole formation to reach hydrocarbon resources deposited in the downhole formation, how to guide a drill bit along the well path, and to provide other useful information during hydrocarbon preparation, drilling, and production stages.

However, logs of the formation may not always clearly indicate the formation dip of the formation. Operators may sometimes manually examine the logs of the formation to estimate the formation dip. However, such manual procedures take time, and accuracy is not guaranteed.

BRIEF DESCRIPTION OF THE DRAWINGS

Illustrative embodiments of the present disclosure are described in detail below with reference to the attached drawing figures, which are incorporated by reference herein, and wherein.

Figure 1A:
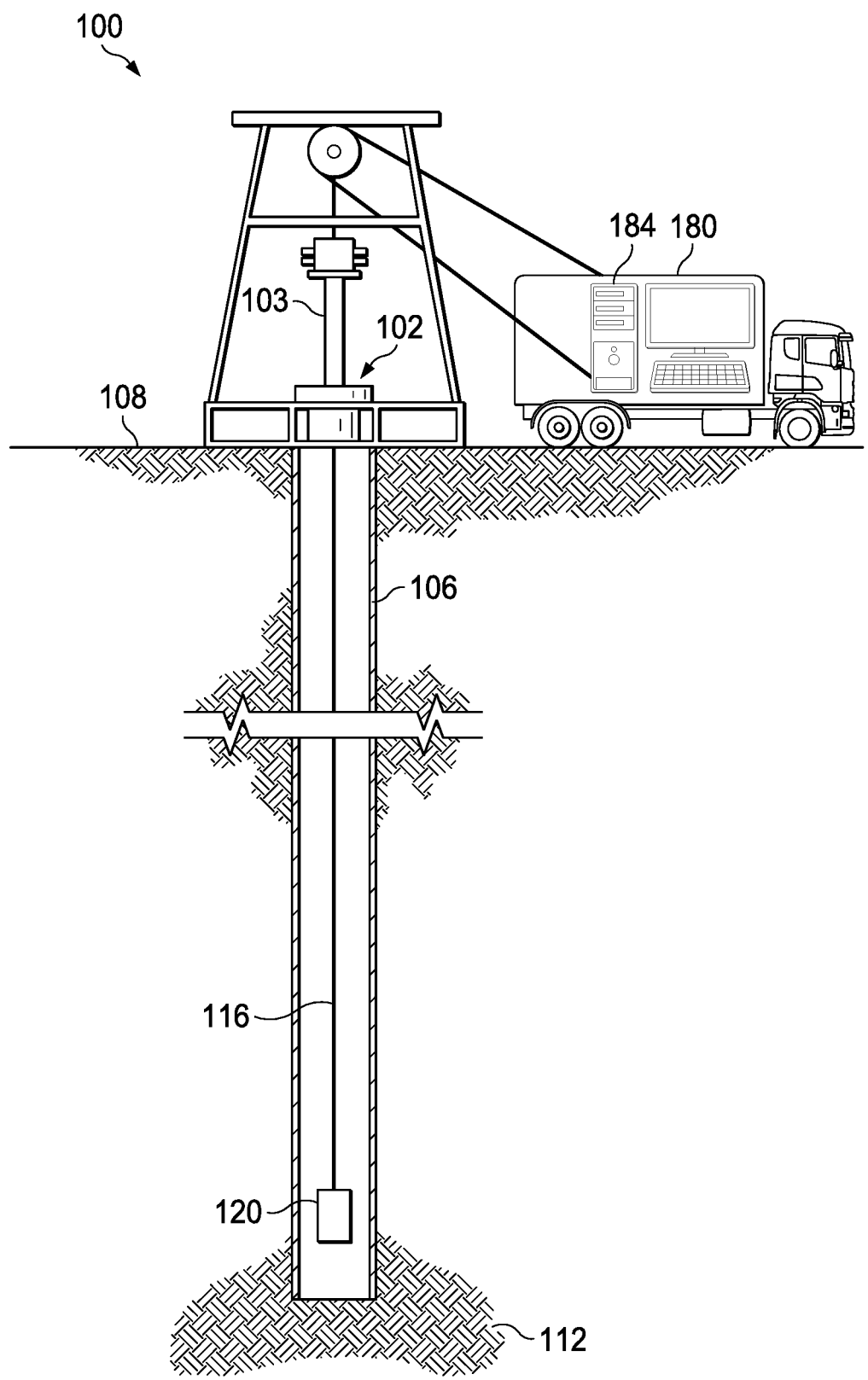
FIG. 1A is a schematic, side view of a logging environment, where logs of formations obtained during logging operations are utilized to determine a formation dip of the downhole formation illustrated in FIG. 1A.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to evaluate a formation dip of a formation. As used herein, a formation dip refers to a dip in a formation bedding of the formation. The formation dip of a formation may be a measurement of a relative dip of the formation, true vertical dip of the formation, apparent dip of the formation, as well as other quantifiable indications of the dip of the formation. Color images of logs of the formation are sometimes obtained during or after LWD, MWD, or other types of logging or measuring operations. In some embodiments, different colors (or different ranges of colors) of the color image represent different numerical values of the formation dip at different locations of the formation bedding. In one or more of such embodiments, darker colors represent boundaries and cusps (as defined below) of the formation. In other embodiments, different colors and different ranges of colors represent different numerical values of other types of measured formation properties, such as, the resistivity of the formation, the amount of radiation (such as gamma radiation, x-radiation, or another form of electromagnetic radiation) emitted by the formation, the density of the formation, the material properties of the formation, as well as other tangible formation properties of the formation. In one or more embodiments, darker colors represent higher values of a measured formation property (such as greater density) whereas lighter colors represent lower values of the measured formation property. In other embodiments, darker colors represent lower values of a measured formation property (such as resistivity) whereas lighter colors represent higher values of the measured formation property. In further embodiments, different colors and different ranges of colors are tool specific and are defined based on the type of tool used to evaluate the formation. The formation evaluation system filters the colors of the color image to determine cusps of the formation dip. As used herein, a cusp of the formation dip represents points on the color drawing that indicate whether a borehole is cutting down (deeper in true vertical depth) through the formation or cutting up (shallower in true vertical depth) through the formation. In some embodiments, the formation evaluation system separates different colors of the color image into different shades and filters the colors of the color image based on the different shades to determine the cusps of the formation dip. In other embodiments, the formation evaluation system separates different colors of the color image into different color ranges and filters the colors of the color image based on the different color ranges to determine the cusps of the formation dip.

The formation evaluation system then performs a cross correlation of a reference wave with the cusps of the formation dip to match curvatures of the reference wave with the one or more cusps of the formation dip illustrated in the color image. As used herein, a reference wave is a wave suitable for evaluating a formation bedding. Moreover, the reference wave is generated based on known parameters of the formation bedding, such as a maximum angle of the formation bedding, a minimum angle of the formation bedding, a threshold range of the azimuthal angle of the formation bedding (such as between 0° and 5°), material properties of the formation bedding, depth of the formation bedding, orientation of a borehole relative to the formation bedding, as well as other quantifiable parameters of the formation bedding. In some embodiments, the reference wave is a sinusoidal wave. In other embodiments, the reference wave is a square wave, or another periodic waveform.

In some embodiments, the system performs a pixel row by pixel row comparison of the color image of the log of the formation to cross correlate the cusps of the formation dips with the curvatures of the reference wave. More particularly, the system, after determining the cusps of the formation, performs a pixel row by pixel row comparison of shades indicative of the cusps of the formation dips with curvatures of the reference wave to cross correlate the reference wave with the one or more cusps of the formation dip. In other embodiments, the system performs a pixel-by-pixel comparison of shades indicative of the cusps of the formation dips with the curvatures of the reference wave to cross correlate the reference wave with the one or more cusps of the formation dip. In some embodiments, the system filters the cusps of the formation dip having less than or equal to a threshold amplitude and cross correlates the reference wave with only the one or more cusps of the formation dip having amplitudes greater than the threshold amplitude to match curvatures of the reference wave with the one or more cusps of the formation dip having amplitudes greater than the threshold amplitude. In some embodiments, the system determines that the curvatures of the reference wave match the one or more cusps of the formation dip if a color spread of the one or more cusps of the formation dip is below a threshold spread.

The system then generates a wave indicative of the formation dip that matches the one or more cusps of the formation dip with the reference wave. In some embodiments, the system accentuates the generated wave indicative of the formation dip on the color image and provides the color image for display on a display of an electronic device. Additional descriptions of the foregoing systems and methods to evaluate formation dips of the formation are described in the paragraphs below and are illustrated in FIGS. 1-4.

Turning now to the figures, FIG. 1A is a schematic, side view of a logging environment 100, where data indicative of logs of a formation 112 obtained by a tool 120 that is deployed in a borehole 106 during logging operations are utilized to determine a formation dip of formation 112. As used herein, "tool 120" represents any tool or component thereof operable of obtaining data indicative of a formation dip of a formation bedding of a downhole formation, such as formation 112. In some embodiments, tool 120 includes one or more sensor components operable of measuring the formation dip of the formation bedding of the downhole formation. FIG. 1A may also represent another completion or preparation environment where a logging operation is performed. In the embodiment of FIG. 1A, a well 102 having the borehole 106 extends from a surface 108 of well 102 to or through formation 112. A conveyance 116, optionally carried by a vehicle 180, is positioned proximate to well 102. Conveyance 116 along with tool 120 are lowered down the borehole 106, i.e. downhole. In one or more embodiments, conveyance 116 and tool 120 are lowered downhole through a blowout preventer 103.

In one or more embodiments, conveyance 116 may be wireline, slickline, coiled tubing, drill pipe, production tubing, downhole tractor or another type of conveyance operable to deploy tool 120. Conveyance 116 provides mechanical suspension of tool 120 as tool 120 is deployed downhole. In one or more embodiments, conveyance 116 also provides power to tool 120 as well as other downhole components. In one or more embodiments, conveyance 116 also provides downhole telemetry. Additional descriptions of telemetry are provided in the paragraphs below. In one or more embodiments, conveyance 116 also provides a combination of power and downhole telemetry to tool 120. For example, where conveyance 116 is a wireline, coiled tubing (including electro-coiled-tubing), or drill pipe, power and data are transmitted along conveyance 116 to tool 120.

Figure 2:
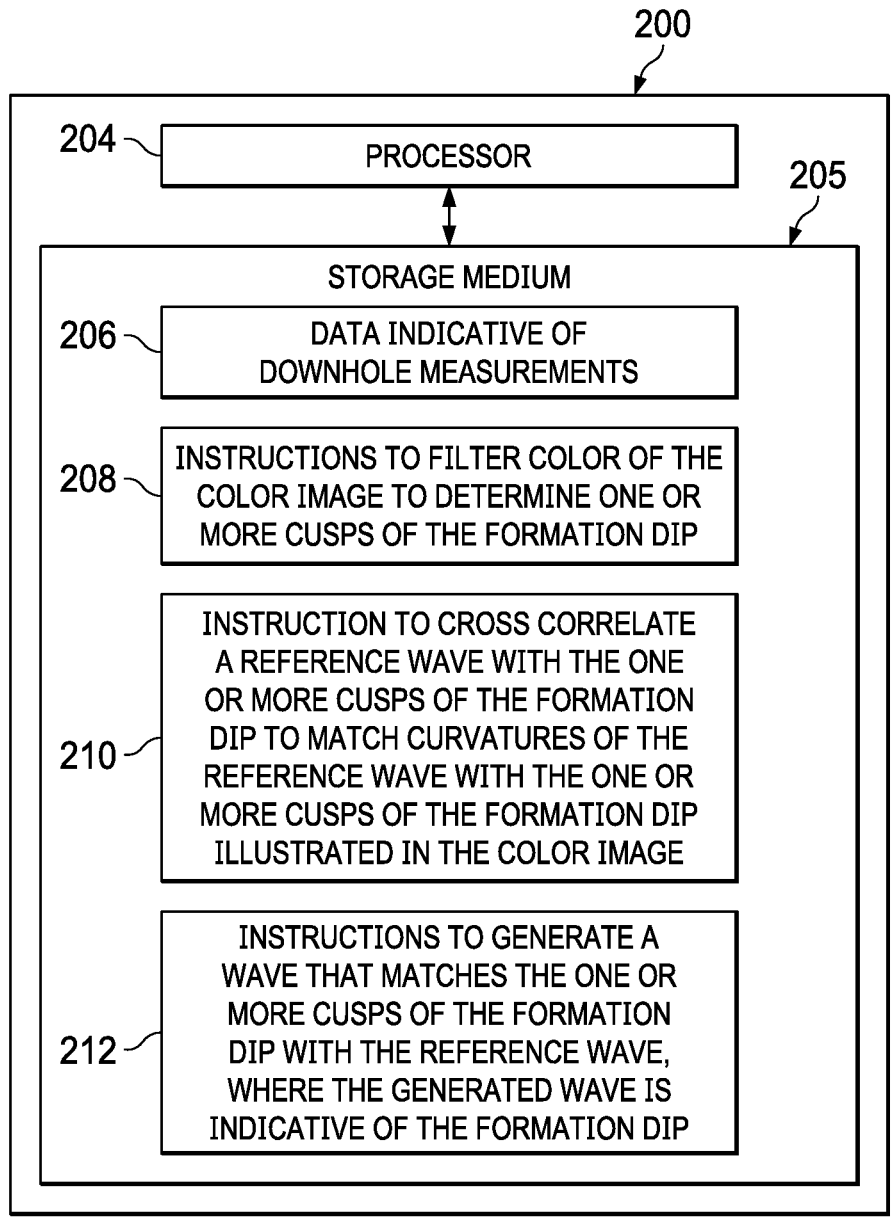
FIG. 2 is a block diagram of a formation dip evaluation system deployable in the wireline environment of FIGS. 1A and 1n the LWD/MWD environment of FIG. 1B.

In some embodiments, a surface based electronic device, such as controller 184, includes a processor configured to execute instructions stored in a storage medium, such as storage medium 205 of FIG. 2 to determine formation dips of formation beddings of formation 112 based on measurements obtained from tool 120. As used herein, controller 184 represents any electronic device having a processor that is configured to (execute instructions) perform operations described herein to determine a formation dip of a formation bedding, such as a formation bedding of formation 112. In such embodiments, data and measurements obtained by tool 120 are transmitted to controller 184 and are processed by the processor of the controller 184. Additional descriptions of the processor and operations performed by the processor are described in the paragraphs below. In some embodiments, tool 120 includes a processor (not shown) that is configured to execute the instructions to perform operations described herein to determine a dip of a formation and to generate a wave indicative of the dip of the formation. In such embodiments, tool 120 is communicatively connected to the controller 184 via a telemetry system described herein and is operable to provide data indicative of the generated wave to controller 184.

Figure 1B:
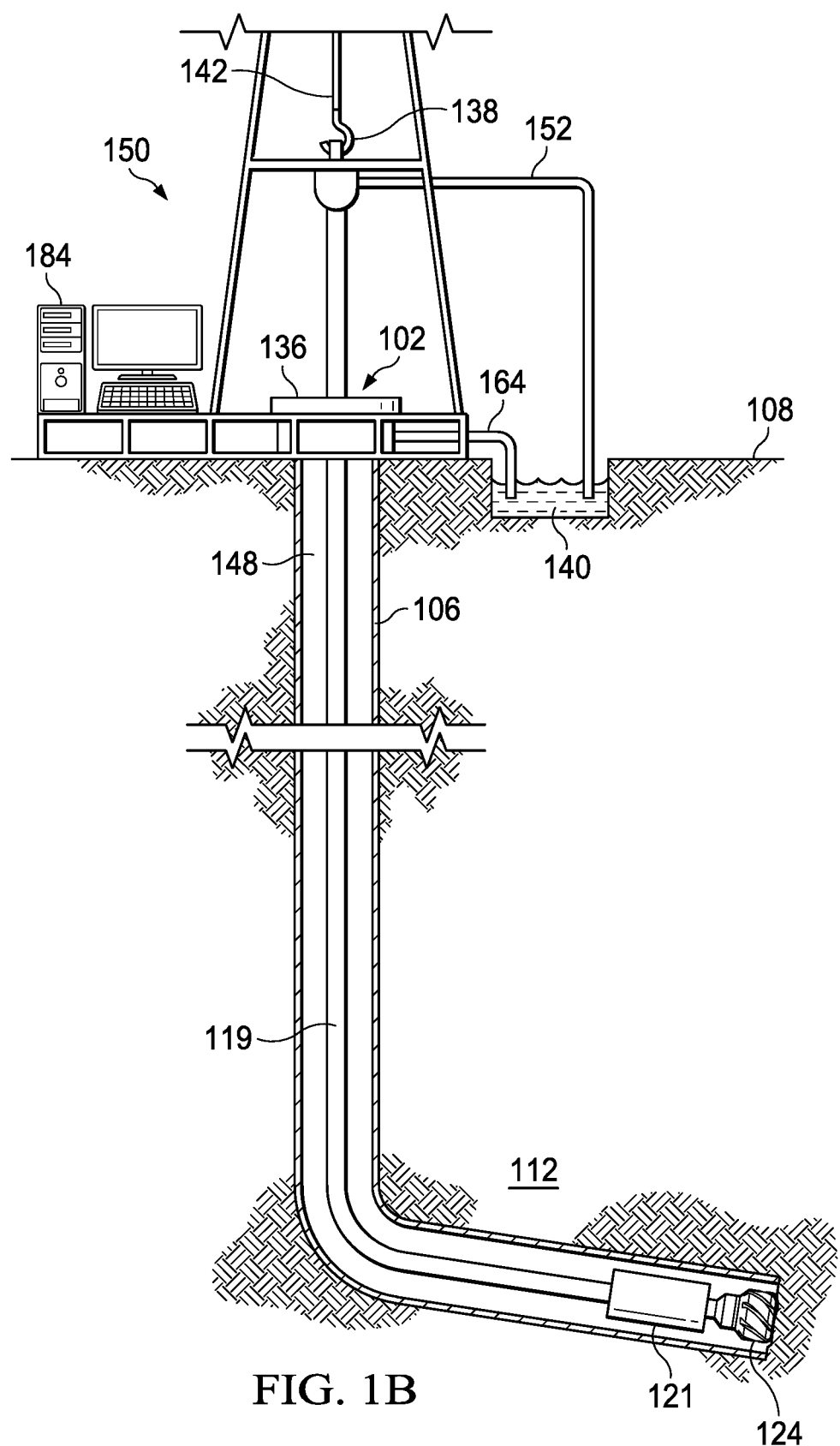
FIG. 1B is a schematic, side view of a LWD/MWD environment where logs of formations obtained during LWD/MWD operations are utilized to evaluate a formation dip of the formation illustrated in FIG. 1B.

FIG. 1B is a schematic, side view of a LWD/MWD environment 150, where data indicative of logs of formation 112 are obtained by a tool 121 during LWD/MWD operations are utilized to evaluate a formation dip of formation 112. FIG. 1B may also represent another completion or preparation environment where a drilling operation is performed. A hook 138, cable 142, traveling block (not shown), and hoist (not shown) are provided to lower a drill sting 119 down the borehole 106 or to lift the drill string 119 up from the borehole 106.

At the wellhead 136, an inlet conduit 152 is coupled to a fluid source (not shown) to provide fluids, such as drilling fluids, downhole. The drill string 119 has an internal cavity that provides a fluid flow path from the surface 108 down to tool 121. In some embodiments, the fluids travel down the drill string 119, through tool 121, and exit the drill string 119 at the drill bit 124. The fluids flow back towards the surface 108 through a wellbore annulus 148 and exit the wellbore annulus 148 via an outlet conduit 164 where the fluids are captured in container 140. In LWD systems, sensors or transducers (not shown) are typically located at the lower end of the drill string 119. In one or more embodiments, sensors employed in LWD applications are built into a cylindrical drill collar that is positioned close to the drill bit 124. While drilling is in progress, these sensors continuously or intermittently determine the formation dip of a formation bedding of formation 112 proximate to drill bit 124, and transmit the information to a surface detector by one or more telemetry techniques, including, but not limited to mud pulse telemetry, acoustic telemetry, and electromagnetic wave telemetry. In one or more embodiments, where a mud pulse telemetry system is deployed in the borehole 106 to provide telemetry, telemetry information is transmitted by adjusting the timing or frequency of viable pressure pulses in the drilling fluid that is circulated through the drill string 119 during drilling operations. In one or more embodiments, an acoustic telemetry system that transmits data via vibrations in the tubing wall of the drill string 119 is deployed in the borehole 106 to provide telemetry. More particularly, the vibrations are generated by an acoustic transmitter (not shown) mounted on the drill string 119 and propagate along the drill string 119 to an acoustic receiver (not shown) also mounted on the drill string 119. In one or more embodiments, an electromagnetic wave telemetry system that transmits data using current flows induced in the drill string 119 is deployed in the borehole 106 to provide telemetry. Additional types of telemetry systems may also be deployed in the borehole 106 to transmit data from tool 121 and other downhole components to controller 184. Tool 121, similar to tool 120 shown in FIG. 1A, is also operable to obtain measurements indicative of the dip of formation 112 and provide data indicative of the dip of formation 112 to controller 184. Additional descriptions of the operations performed by the tools 120 and 121 are provided in the paragraphs below.

FIG. 2 is a block diagram of a formation dip evaluation system 200 that is deployable in the logging environment of FIGS. 1A and 1n the LWD/MWD environment of FIG. 1B. The formation dip evaluation system 200 includes a storage medium 205 and a processor 204. The storage medium 205 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 205 includes multiple data storage devices. In further embodiments, the multiple data storage devices may be physically stored at different locations. Data indicative of measurements obtained from tools 120 and 121, are transmitted to the formation dip evaluation system 200 and are stored at a first location 206 of the storage medium. As shown in FIG. 2, instructions to filter colors of the color image to determine one or more cusps of the formation dip are stored at a second location 208 of the storage medium 205, instructions to cross correlate a reference wave with the one or more cusps of the formation dip to match curvatures of the reference wave with the one or more cusps of the formation dip illustrated in the color image are stored at a third location 210 of the storage medium 205, and instructions to generate a wave that matches the one or more cusps of the formation dip with the reference wave, wherein the generated wave is indicative of the formation dip are stored at a fourth location 212 of the storage medium 205. The instructions to perform other operations described herein are also stored in the storage medium 205.

In some embodiments, formation dip evaluation system 200 contains additional components used to evaluate formation properties of the downhole formation. For example, in some embodiments, formation dip evaluation system 200 also includes tools 120 and 121 of FIGS. 1A and 1B as well as other downhole sensors used to obtain data indicative of formation dips of formation 112. In other embodiments, formation dip evaluation system 200 also includes telemetry systems described in FIGS. 1A and 1B, or other telemetry systems operable to transmit data between tools 120 and 121 of FIGS. 1A and 1B and controller 184. In one or more such embodiments, formation dip evaluation system 200 also includes transmitters, receivers, transceivers, as well as other components used to transmit data between tools 120 and 121 and controller 184. In further embodiments, formation dip evaluation system 200 also includes conveyance 119 of FIG. 1A and wire line 116 of FIG. 1B, which are used to deploy tool 120 and drill bit 124 downhole. Addition description of operations performed by processor 204 to determine the formation dip of different locations of the formation are provided in the paragraphs below.

Figure 3A:
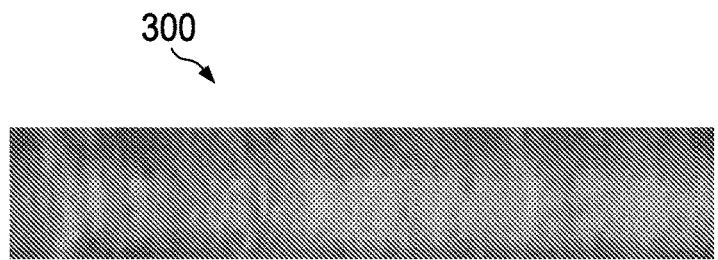
FIG. 3A is an exemplary image of a log of a section of a borehole and surrounding formation of FIG. 1A.
Figure 3B:
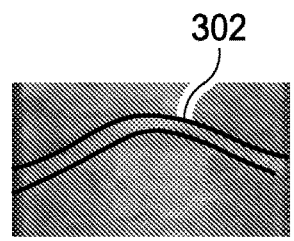
FIG. 3B is an exemplary wave formed from the cusps of the formation dip.
Figure 3C:
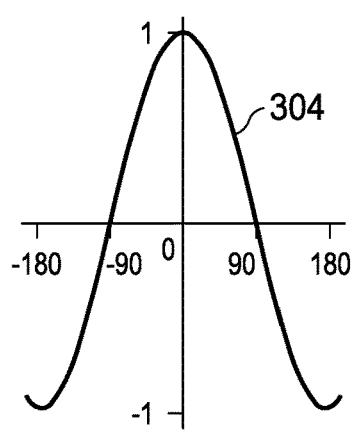
FIG. 3C is an exemplary reference wave.

FIG. 3A is an exemplary image 300 of a log of a section of borehole 106 and surrounding formation 112 of FIG. 1A. In one or more of such embodiments, darker colors of image 300 represent boundaries and cusps of formation 112. FIG. 3B is an exemplary wave 302 formed from the cusps of the formation dip of formation 112. In some embodiments, the formation dip evaluation system (such as described in FIG. 2) separates different colors of image 300 into different shades and filters the colors based on the shades to determine the cusps of formation 112. In the illustrated embodiment, the formation dip evaluation system filters the colors of image 300 to determine a cusp illustrated by exemplary wave 302. FIG. 3B illustrates only one exemplary cusp of the formation dip identified in image 300. In other embodiments, image 300 includes multiple cusps not illustrated in FIG. 3B. FIG. 3C is an exemplary reference wave 304. In some embodiments, the formation dip evaluation system receives a set of parameters of the formation bedding, such as a maximum angle of the formation bedding, a minimum angle of the formation bedding, a threshold range of the angle of the formation bedding, material properties of the formation bedding, depth of the formation bedding, orientation of a borehole relative to the formation bedding, as well as other quantifiable parameters of the formation bedding. In such embodiments, the formation dip evaluation system generates reference wave 304 based on one or more of the received parameters of the formation bedding.

The generated reference wave 304 is cross correlated with exemplary wave 302. In some embodiments, the formation dip evaluation system of FIG. 2 dynamically performs the cross-correlation operations described herein to cross corollate exemplary wave 302 with reference wave 304. In one or more of such embodiments, the formation dip evaluation system performs cross-correlation operations based on predetermined parameters, such as the curvatures of exemplary wave 302 relative to the curvatures of reference wave 304, the amplitude of exemplary wave 302 relative to the amplitude of reference wave 304, the frequency of exemplary wave 302 relative to the frequency of reference wave 304, threshold deviations between exemplary wave 302 and reference wave 304, as well as other quantifiable deviations between exemplary wave 302 and reference wave 304. In some embodiments, the formation dip evaluation system performs a pixel row by pixel row comparison of the shades with the curvatures of reference wave 304 to cross correlate the reference wave with the cusp of exemplary wave 302. In one or more of such embodiments, the formation dip evaluation system is further operable to perform a pixel-by-pixel comparison of one or more shades with the curvatures of reference wave 304 to cross correlate the reference wave with the cusp of exemplary wave 302. In some embodiments, the formation dip evaluation system determines that the curvatures of reference wave 304 match the cusp of exemplary wave 302 if a color spread of the cusp of exemplary wave 302 is below a threshold color spread, such as below a threshold range of colors.

In other embodiments, the formation dip evaluation system queries previously performed cross correlations and utilizes one or more parameters used in the previously performed cross correlations. For example, where a cross correlation was previously performed on another section of borehole 106 proximate to the section of borehole 106 illustrated in FIGS. 3A-3B, the formation dip evaluation system obtains the parameters used to perform the previously performed cross correlation, and utilizes the obtained parameters as the default parameters for cross correlating exemplary wave 302 with reference wave 304.

Figure 3D:
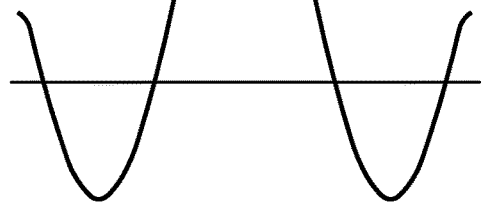
FIG. 3D is an exemplary wave generated from cross correlating the cusp illustrated in FIG. 3B with the exemplary reference wave illustrated in FIG. 3C.

In other embodiments, the formation dip evaluation system receives one or more parameters from the operator. In such embodiments, the formation dip evaluation system utilizes the parameters provided by the operator to cross correlate exemplary wave 302 with reference wave 304. In one or more of such embodiments, the formation dip evaluation system sets the parameters provided by the operator as default parameters for performing subsequent cross correlation operations on other sections of borehole 106 proximate to the section of borehole 106 illustrated in FIGS. 3A-3B. As such, the formation dip evaluation system is operable of learning from previous selections made by operators and to dynamically perform subsequent cross correlation operations based on preferences of the operators. FIG. 3D is an exemplary wave indicative of the dip of formation 112. FIG. 3D is an exemplary wave 306 generated from cross correlating the cusp illustrated by exemplary wave 302 of FIG. 3B with exemplary reference wave 304 illustrated in FIG. 3C. More particularly, exemplary wave 306 is indicative of the dip of formation 112 proximate to the section of borehole 106 illustrated in FIGS. 3A-3B. In some embodiments, the amplitude of exemplary wave 306 is determined based on the shallowest and deepest depths of cusps in exemplary image 300. In some embodiments, iterative correlations of small inclination steps are made to determine the anticipated amplitude of exemplary wave 306. In some embodiments, exemplary wave 306 is superimposed on FIG. 3B (not shown) to illustrate to generated dip of formation 112 relative to the cusps of formation 112. In other embodiments, exemplary wave 306 is generated on another illustration of formation 112 and is displayed on a display of controller 184.

Figure 4:
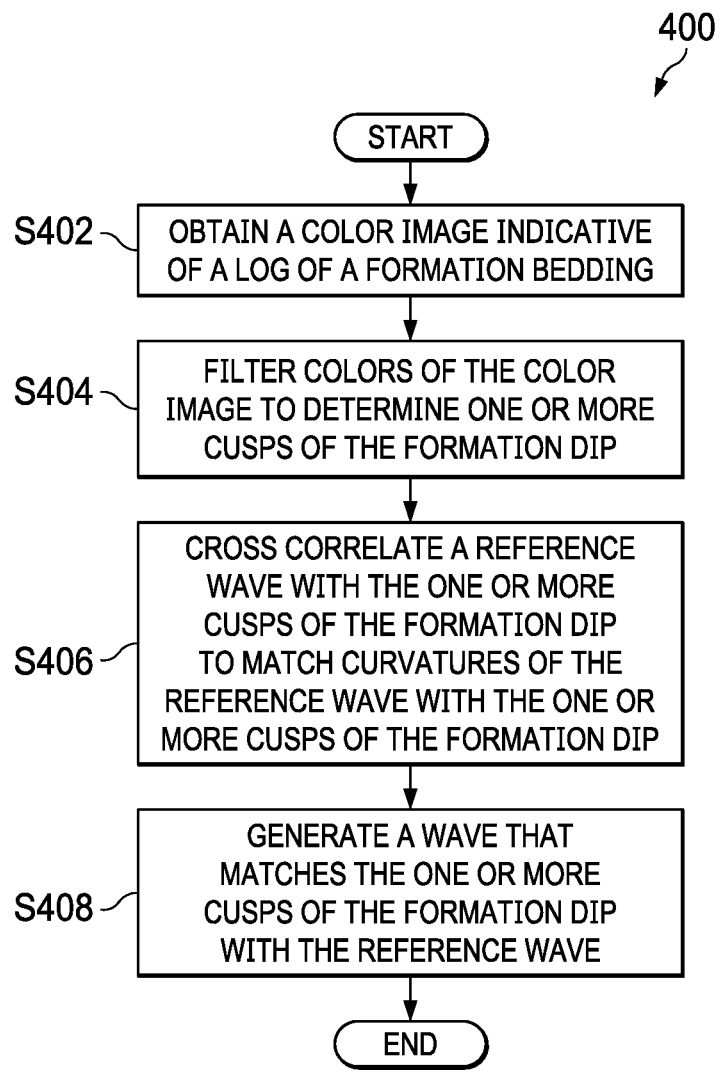
FIG. 4 is a flow chart of a process to evaluate a formation dip.

FIG. 4 is a flow chart of a process 400 to evaluate formation dip. Although the operations in the process 400 are shown in a particular sequence, certain operations may be performed in different sequences or at the same time where feasible.

As described below, process 400 provides an intuitive way for evaluating formation dips of a downhole formation, such as formation 112 of FIGS. 1A and 1B. The process provides an operator with illustrations of waveforms indicative of formation dips of formation 112, thereby allowing the operator to make informed decisions during different stages of hydrocarbon production. For example, in certain operations, such as preparation and drilling operators, where data used to determine the formation dips of formation 112 are provided in real-time or close to real-time, the process allows the operator to quickly analyze the formation dips of formation 112 and to make real-time decisions, such as how and where to steer a drill bit to avoid certain boundaries. The foregoing allows the operator to make informed real-time adjustments to correct human and machine errors, thereby reducing the financial costs as well as safety hazards attributed to such errors.

A processor of a formation dip evaluation system, such as the formation dip evaluation system 200 at block 5402, obtains a color image indicative of a log of a formation bedding, such as a formation bedding of formation 112 of FIGS. 1A and 1B. In the depicted embodiments of FIGS. 1A and 1B, measurements of the formation dip of formation 112 are made by tools 120 and 121 and are stored on storage medium 205 of FIG. 2. In some embodiments, tools 120 and 121 are also operable to generate, based on the measurements of the formation dip, a color image of a log of the formation bedding of formation 112. In other embodiments, the processor of the formation dip evaluation system 200 generates the color image of the log of the formation bedding based on the measurements obtained by tools 120 and 121.

At block 5404, the processor filters colors of the color image to determine one or more cusps of the formation dip. In some embodiments, the processor separates different colors of the color image into different shades and filters the colors of the color image based on the different shades to determine the cusps of the formation dip. In other embodiments, the processor separates different colors of the color image into different color ranges and filters the colors of the color image based on the different color ranges to determine the cusps of the formation dip. In some embodiments, the processor performs a pixel row by pixel row comparison of one or more shades with the curvatures of the reference wave to cross correlate the reference wave with the one or more cusps of the formation dip. In one or more of such embodiments, the processor performs a pixel-by-pixel comparison of one or more shades with the curvatures of the reference wave to cross correlate the reference wave with the one or more cusps of the formation dip. In some embodiments, the processor filters the colors of the color image by ignoring certain colors or certain ranges of colors.

At block 5406, the processor cross correlates a reference wave with the one or more cusps of the formation dip to match curvatures of the reference wave with the one or more cusps of the formation dip illustrated in the color image. In some embodiments, the processor dynamically performs the cross-correlation operations described herein based on one or more parameters of the formation bedding. In other embodiments, the processor queries previously performed cross correlations and utilizes one or more parameters used in the previously performed cross correlations. Examples of parameters of the formation bedding include, but are not limited to a maximum angle of the formation bedding, a minimum angle of the formation bedding, a threshold range of the azimuthal angle of the formation bedding (such as between 0° and 5°), material properties of the formation bedding, depth of the formation bedding, orientation of a borehole relative to the formation bedding, as well as other quantifiable parameters of the formation bedding. For example, in one or more embodiments, the processor, filters cusps of the formation that have less than or equal to a threshold amplitude and cross correlates the reference wave with only the cusps of the formation dip that have amplitudes greater than the threshold amplitude to match curvatures of the reference wave with the one or more cusps of the formation dip having amplitudes greater than the threshold amplitude.

At block 5408, the processor generates a wave that matches the one or more cusps of the formation dip with the reference wave, wherein the generated wave is indicative of the formation dip. In some embodiments, the processor also accentuates the wave indicative of the formation dip on the color image and displays the color image on controller 184 or the display of another electronic device. In one or more of such embodiments, the accentuated wave is overlaid on an image of a section of a borehole and surrounding formation that has been evaluated by the processor.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a formation dip evaluation system, comprising: memory configured to store: a color image indicative of a log of a formation bedding, wherein different colors of the color image represent different numerical values of a formation dip at different locations of the formation bedding; and a processor in electronic communication with the memory and configured to execute instructions stored in the memory: filter colors of the color image to determine one or more cusps of the formation dip; cross correlate a reference wave with the one or more cusps of the formation dip to match curvatures of the reference wave with the one or more cusps of the formation dip illustrated in the color image, wherein the curvatures of the reference wave are based on one or more parameters of the formation bedding; and generate a wave that matches the one or more cusps of the formation dip with the reference wave, wherein the generated wave is indicative of the formation dip.

Clause 2, the formation dip evaluation system of clause 1, wherein the processor is further configured to execute the instructions to: separate different colors of the color image into one or more shades; and filter the colors of the color image based on the one or more shades to determine the one or more cusps of the formation dip.

Clause 3, the formation dip evaluation system of clause 1 or 2, wherein the processor is further configured to execute the instructions to perform a pixel row by pixel row comparison of one or more shades with the curvatures of the reference wave to cross correlate the reference wave with the one or more cusps of the formation dip.

Clause 4, the formation dip evaluation system of any of clauses 1-3, wherein the processor is further configured to execute the instructions to perform a pixel-by-pixel comparison of one or more shades with the curvatures of the reference wave to cross correlate the reference wave with the one or more cusps of the formation dip.

Clause 5, the formation dip evaluation system of any of clauses 1-4, wherein the processor is further configured to execute the instructions to ignore certain colors within a range of colors when filtering the colors of the color image.

Clause 6, the formation dip evaluation system of any of clauses 1-5, wherein the one or more parameters of the formation bedding includes a threshold range of azimuthal angle of the formation bedding.

Clause 7, the formation dip evaluation system of any of clauses 1-6, wherein the threshold range of azimuthal angle of the formation bedding is between 0° and 5°.

Clause 8, the formation dip evaluation system of any of clauses 1-7, wherein the processor is further configured to execute the instructions to: filter the one or more cusps of the formation dip having less than or equal to a threshold amplitude; and cross correlate the reference wave with only the one or more cusps of the formation dip having amplitudes greater than the threshold amplitude to match curvatures of the reference wave with the one or more cusps of the formation dip having amplitudes greater than the threshold amplitude.

Clause 9, the formation dip evaluation system of any of clauses 1-8, wherein the processor is further configured to execute the instructions to determine that the curvatures of the reference wave match the one or more cusps of the formation dip if a color spread of the one or more cusps of the formation dip is below a threshold spread.

Clause 10, the formation dip evaluation system of clauses 1-9, wherein the processor is further configured to execute the instructions to: accentuate the wave indicative of the formation dip on the color image; and providing the color image for display on a display of an electronic device.

Clause 11, the formation dip evaluation system of any of clauses 1-10, wherein the formation dip is a true vertical dip of the formation bedding.

Clause 12, the formation dip evaluation system of any of clauses 1-11, wherein the formation dip is a relative vertical dip of the formation bedding.

Clause 13, the formation dip evaluation system of any of clauses 1-12, wherein the formation dip is an apparent vertical dip of the formation bedding.

Clause 14, the formation dip evaluation system of any of clauses 1-13, wherein the reference wave is a sinusoidal wave.

Clause 15, a method to evaluate a formation dip, comprising: obtaining a color image indicative of a log of a formation bedding, wherein different colors of the color image represent different numerical values of a formation dip at different locations of the formation bedding; filtering colors of the color image to determine one or more cusps of the formation dip; cross correlating a reference wave with the one or more cusps of the formation dip to match curvatures of the reference wave with the one or more cusps of the formation dip illustrated in the color image, wherein the curvatures of the reference wave are based on one or more parameters of the formation bedding; generating a wave that matches the one or more cusps of the formation dip with the reference wave, wherein the generated wave is indicative of the formation dip; accentuating the wave indicative of the formation dip on the color image; and providing the color image for display on a display of an electronic device.

Clause 16, the method of clause 15, further comprising: separating different colors of the color image into one or more shades; and filtering the colors of the color image based on the one or more shades to determine the one or more cusps of the formation dip.

Clause 17, the method of clause 15 or 16, further comprising performing a pixel row by pixel row comparison of one or more shades with the curvatures of the reference wave to cross correlate the reference wave with the one or more cusps of the formation dip.

Clause 18, the method of any of clauses 15-17, further comprising: filtering the one or more cusps of the formation dip having less than or equal to a threshold amplitude; and cross correlating the reference wave with only the one or more cusps of the formation dip having amplitudes greater than the threshold amplitude to match curvatures of the reference wave with the one or more cusps of the formation dip having amplitudes greater than the threshold amplitude.

Clause 19, the method of any of clauses 15-18, further comprising: determining if a color spread of the one or more cusps of the formation dip is below a threshold spread; and determining that the curvatures of the reference wave match the one or more cusps of the formation dip if the color spread of the one or more cusps of the formation dip is below the threshold spread.

Clause 20, a machine-readable medium comprising instructions stored therein, which when executed by one or more processors, causes the one or more processors to perform operations comprising: obtaining a color image indicative of a log of a formation bedding, wherein different colors of the color image represent different numerical values of a formation dip at different locations of the formation bedding; filtering colors of the color image to determine one or more cusps of the formation dip; cross correlating a reference wave with the one or more cusps of the formation dip to match curvatures of the reference wave with the one or more cusps of the formation dip illustrated in the color image, wherein the curvatures of the reference wave are based on one or more parameters of the formation bedding; generating a wave that matches the one or more cusps of the formation dip with the reference wave, wherein the generated wave is indicative of the formation dip; accentuating the wave indicative of the formation dip on the color image; and providing the color image for display on a display of an electronic device.

Although certain embodiments disclosed herein describes transmitting electrical currents from electrodes deployed on an inner string to electrodes deployed on an outer string, one of ordinary skill would understand that the subject technology disclosed herein may also be implemented to transmit electrical currents from electrodes deployed on the outer string to electrodes deployed on the inner string.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A formation dip evaluation system, comprising:
   memory configured to store a color image indicative of a log of a formation bedding, wherein different colors of the color image represent different numerical values of a formation dip at different locations of the formation bedding; and
   a processor in electronic communication with the memory and configured to execute instructions stored in the memory to:
   filter colors of the color image to determine one or more cusps of the formation dip;
   cross correlate a reference wave with the one or more cusps of the formation dip to match curvatures of the reference wave with the one or more cusps of the formation dip illustrated in the color image, wherein the curvatures of the reference wave are based on one or more parameters of the formation bedding;
   determine that the curvatures of the reference wave match the one or more cusps of the formation dip if a color spread of the one or more cusps of the formation dip is below a threshold spread; and
   generate a wave that matches the one or more cusps of the formation dip with the reference wave, wherein the generated wave is indicative of the formation dip.

2. The formation dip evaluation system of claim 1, wherein the processor is further configured to execute the instructions to:
   separate different colors of the color image into one or more shades; and
   filter the colors of the color image based on the one or more shades to determine the one or more cusps of the formation dip.

3. The formation dip evaluation system of claim 2, wherein the processor is further configured to execute the instructions to perform a pixel row by pixel row comparison of one or more shades with the curvatures of the reference wave to cross correlate the reference wave with the one or more cusps of the formation dip.

4. The formation dip evaluation system of claim 3, wherein the processor is further configured to execute the instructions to perform a pixel-by-pixel comparison of one or more shades with the curvatures of the reference wave to cross correlate the reference wave with the one or more cusps of the formation dip.

5. The formation dip evaluation system of claim 1, wherein the processor is further configured to execute the instructions to ignore certain colors within a range of colors when filtering the colors of the color image.

6. The formation dip evaluation system of claim 1, wherein the one or more parameters of the formation bedding includes a threshold range of azimuthal angle of the formation bedding.

7. The formation dip evaluation system of claim 6, wherein the threshold range of azimuthal angle of the formation bedding is between 0° and 5°.

8. The formation dip evaluation system of claim 1, wherein the processor is further configured to execute the instructions to:
   filter the one or more cusps of the formation dip having less than or equal to a threshold amplitude; and
   cross correlate the reference wave with only the one or more cusps of the formation dip having amplitudes greater than the threshold amplitude to match curvatures of the reference wave with the one or more cusps of the formation dip having amplitudes greater than the threshold amplitude.

9. The formation dip evaluation system of claim 1, wherein the processor is further configured to execute the instructions to:
   accentuate the wave indicative of the formation dip on the color image; and
   providing the color image for display on a display of an electronic device.

10. The formation dip evaluation system of claim 1, wherein the formation dip is a true vertical dip of the formation bedding.

11. The formation dip evaluation system of claim 1, wherein the formation dip is a relative vertical dip of the formation bedding.

12. The formation dip evaluation system of claim 1, wherein the formation dip is an apparent vertical dip of the formation bedding.

13. The formation dip evaluation system of claim 1, wherein the reference wave is a sinusoidal wave.

14. A method to evaluate a formation dip, comprising:
    obtaining a color image indicative of a log of a formation bedding, wherein different colors of the color image represent different numerical values of a formation dip at different locations of the formation bedding;

filtering colors of the color image to determine one or more cusps of the formation dip;

cross correlating a reference wave with the one or more cusps of the formation dip to match curvatures of the reference wave with the one or more cusps of the formation dip illustrated in the color image, wherein the curvatures of the reference wave are based on one or more parameters of the formation bedding;

determining if a color spread of the one or more cusps of the formation dip is below a threshold spread; and determining that the curvatures of the reference wave match the one or more cusps of the formation dip if the color spread of the one or more cusps of the formation dip is below the threshold spread;

generating a wave that matches the one or more cusps of the formation dip with the reference wave, wherein the generated wave is indicative of the formation dip;

accentuating the wave indicative of the formation dip on the color image; and providing the color image for display on a display of an electronic device.

15. The method of claim 14, further comprising:

separating different colors of the color image into one or more shades; and filtering the colors of the color image based on the one or more shades to determine the one or more cusps of the formation dip.

16. The method of claim 15, further comprising performing a pixel row by pixel row comparison of one or more shades with the curvatures of the reference wave to cross correlate the reference wave with the one or more cusps of the formation dip.

17. The method of claim 16, further comprising:

filtering the one or more cusps of the formation dip having less than or equal to a threshold amplitude; and cross correlating the reference wave with only the one or more cusps of the formation dip having amplitudes greater than the threshold amplitude to match curvatures of the reference wave with the one or more cusps of the formation dip having amplitudes greater than the threshold amplitude.

18. A non-transitory machine-readable medium comprising instructions stored therein, which when executed by one or more processors, causes the one or more processors to perform operations comprising:

obtaining a color image indicative of a log of a formation bedding, wherein different colors of the color image represent different numerical values of a formation dip at different locations of the formation bedding;

filtering colors of the color image to determine one or more cusps of the formation dip;

cross correlating a reference wave with the one or more cusps of the formation dip to match curvatures of the reference wave with the one or more cusps of the formation dip illustrated in the color image, wherein the curvatures of the reference wave are based on one or more parameters of the formation bedding;

determine if a color spread of the one or more cusps of the formation dip is below a threshold spread; and determine that the curvatures of the reference wave match the one or more cusps of the formation dip if the color spread of the one or more cusps of the formation dip is below the threshold spread;

generating a wave that matches the one or more cusps of the formation dip with the reference wave, wherein the generated wave is indicative of the formation dip;

accentuating the wave indicative of the formation dip on the color image; and providing the color image for display on a display of an electronic device.

* * * * *